United States Patent [19]

Le-Khac et al.

[11] Patent Number: 5,627,122
[45] Date of Patent: May 6, 1997

[54] HIGHLY ACTIVE DOUBLE METAL CYANIDE COMPLEX CATALYSTS

[75] Inventors: Bi Le-Khac, West Chester, Pa.; Harry R. Hinney, Cross Lanes; Paul T. Bowman, Hurricane, both of W. Va.

[73] Assignee: ARCO Chemical Technology, L.P., Greenville, Del.

[21] Appl. No.: 505,938

[22] Filed: Jul. 24, 1995

[51] Int. Cl.$^6$ .................................... B01J 27/26
[52] U.S. Cl. .................................... 502/175; 502/200
[58] Field of Search .................................... 502/175, 200

[56] References Cited

U.S. PATENT DOCUMENTS

| | | |
|---|---|---|
| 3,278,457 | 10/1966 | Milgrom. |
| 3,278,458 | 10/1966 | Belner. |
| 3,404,109 | 10/1968 | Milgrom. |
| 3,427,256 | 2/1969 | Milgrom. |
| 3,427,334 | 2/1969 | Belner. |
| 3,427,335 | 2/1969 | Herold. |
| 3,538,043 | 11/1970 | Herold. |
| 3,900,518 | 8/1975 | Milgrom. |
| 3,941,849 | 3/1976 | Herold. |
| 4,472,560 | 9/1984 | Kuyper et al. ........... 526/120 |
| 4,477,589 | 10/1984 | vander Hulst et al. ....... 502/169 |
| 4,843,054 | 6/1989 | Harper ................ 502/175 |
| 5,145,883 | 9/1992 | Saito et al. ............. 521/172 |
| 5,158,922 | 10/1992 | Hinney et al. ........... 502/175 |
| 5,223,583 | 6/1993 | Higuchi et al. .......... 525/404 |
| 5,470,813 | 11/1995 | Le-Khac ............... 502/175 |
| 5,482,908 | 1/1996 | Le-Khac ............... 502/156 |
| 5,498,583 | 3/1996 | Le-Khac ............... 502/154 |

FOREIGN PATENT DOCUMENTS 4145123  5/1992  Japan.

OTHER PUBLICATIONS

J.L. Schuchandt et al., "Preparation of High Molecular Weight Polyols Using Double Metal Cyanide Catalysts," Proceedings of the SPI, 32nd Annual Polyurethane Technical/Marketing Conference, Oct. 1989 p. 360.

Primary Examiner—Glenn A. Caldarola
Assistant Examiner—Elizabeth D. Wood
Attorney, Agent, or Firm—Jonathan L. Schuchardt

[57] ABSTRACT

Highly active double metal cyanide (DMC) complex catalysts and methods for making them are disclosed. The catalysts contain less than about 0.2 moles of metal salt per mole of DMC compound in the catalyst, and unlike other highly active DMC catalysts, are substantially crystalline. Polyether polyols made from the catalysts have low unsaturation and are useful for making many types of polyurethane products.

25 Claims, 5 Drawing Sheets

2-THETA - SCALE

COUNTS

HIGHLY ACTIVE DOUBLE METAL CYANIDE COMPLEX CATALYSTS

FIELD OF THE INVENTION

The invention relates to double metal cyanide (DMC) complex catalysts useful for epoxide polymerization. The catalysts, which contain an unusually low level of metal salt, are highly active. The invention includes methods for preparing the catalysts. Polyether polyol products made using the catalysts have exceptionally low unsaturations.

BACKGROUND OF THE INVENTION

Double metal cyanide (DMC) compounds are well known catalysts for epoxide polymerization. The catalysts are highly active, and give polyether polyols that have low unsaturation compared with similar polyols made using basic (KOH) catalysis. Conventional DMC catalysts are prepared by reacting aqueous solutions of metal salts and metal cyanide salts to form a precipitate of the DMC compound. The catalysts can be used to make a variety of polymer products, including polyether, polyester, and polyetherester polyols. Many of the polyols are useful in various polyurethane coatings, elastomers, sealants, foams, and adhesives.

DMC catalysts are usually prepared in the presence of a low molecular weight organic complexing agent, typically an ether such as glyme (dimethoxyethane) or diglyme. The complexing agent favorably impacts the activity of the catalyst for epoxide polymerization. Other known complexing agents include alcohols, ketones, esters, amides, ureas, and the like. Recently, we described substantially amorphous DMC catalysts prepared using water-soluble aliphatic alcohol complexing agents such as tert-butyl alcohol in U.S. Pat. No. 5,470,813.

In one conventional preparation, aqueous solutions of zinc chloride and potassium hexacyanocobaltate are combined. The resulting precipitate of zinc hexaoyanocobaltate is combined with an organic complexing agent. The resulting catalyst has the general formula:

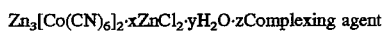

$Zn_3[Co(CN)_6]_2 \cdot xZnCl_2 \cdot yH_2O \cdot z$Complexing agent

DMC catalysts are made with an excess of the metal salt compared with the amount of metal cyanide salt used. See, e.g., U.S. Pat. Nos. 3,427,256, 3,278,457, and 3,941,849. More recently, we taught (U.S. Pat. No. 5,158,922) an improved process for making easily filtered DMC catalysts by controlling the order of reagent addition, the reaction temperature, and the stoichiometric ratio of the reactants. The '922 patent teaches to use at least about a 100% stoichiometric excess of the metal salt relative to the metal cyanide salt. Thus, in the example above, at least about 3 moles of zinc chloride is used per mole of potassium hexacyanocobaltate. The examples in the reference use glyme as the organic complexing agent. Zinc hexacyanocobaltate catalysts prepared by this procedure generally have zinc chloride to zinc hexacyanocobaltate mole ratios of about 0.6 or more. The '922 patent discloses (in a formula) compositions having as little as 0.2 moles of metal salt per mole of DMC compound in the catalyst.

While the procedure described in the '922 patent (large excess of zinc chloride) works well with glyme, it is less satisfactory for use with other complexing agents, including tert-butyl alcohol. When tert-butyl alcohol is used, the catalyst precipitate becomes gelatinous and difficult to isolate. In addition, the activity of these catalysts for epoxide polymerizations, although quite high compared with KOH catalysts, is still somewhat less than desirable. The catalysts prepared by the reference procedure with glyme as the organic complexing agent typically polymerize propylene oxide with an activity less than about 2 g PO/min at 100 ppm of catalyst, based on the weight of finished polyol, at 105° C.

Recently, we described substantially amorphous DMC catalysts in U.S. Pat. No. 5,470,813. These catalysts are preferably made using a water-soluble aliphatic alcohol complexing agent such as tert-butyl alcohol. An excess amount of metal salt is used to make the catalyst. Zinc hexacyanocobaltate catalysts described therein have more than 0.2 moles of metal salt per mole of zinc hexacyanocobaltate present, typically more than 0.5 moles of metal salt per mole of zinc hexacyanocobaltate. The X-ray diffraction patterns show that the catalysts are substantially amorphous; i.e., the catalysts are characterized by the substantial absence of sharp lines in the powder X-ray diffraction pattern (see FIG. 5). The catalysts described in the '534 application have far greater activity for polymerizing propylene oxide than previously known catalysts. For example, rates in excess of about 3 g PO/min at 100 ppm of catalyst were achieved.

Improved double metal cyanide catalysts are needed. Preferred catalysts would be easy to prepare and isolate, and would have excellent activity for polymerizing epoxides. Preferred catalysts would give polyether polyols having narrow molecular weight distributions and low unsaturation.

SUMMARY OF THE INVENTION

The invention is an improved catalyst for polymerizing epoxides. The catalyst is a highly active, substantially crystalline double metal cyanide (DMC) catalyst. Like other DMC catalysts, these complexes are made by reacting aqueous solutions of a metal salt and a metal cyanide salt in the presence of an organic complexing agent. The metal salt is used in excess compared with the amount of metal cyanide salt, and the resulting DMC complex includes some of the metal salt. Unlike previously known catalysts, these catalysts contain less than about 0.2 moles of the metal salt per mole of DMC compound in the catalyst.

In contrast to the substantially amorphous DMC catalysts that we discovered previously, the catalysts of this invention exhibit a powder X-ray diffraction pattern of sharp lines (see FIGS. 2 and 3). Surprisingly, these crystalline catalysts have excellent activity for polymerizing epoxides (greater than 3 g PO/min at 100 ppm catalyst). The catalyst activities are significantly higher than the activities available from conventional KOH catalysts, and are also higher than those of ordinary DMC catalysts (as reported, e.g., in U.S. Pat. No. 5,158,922). Previously, the only catalysts known to have such high activities were the substantially amorphous catalysts described in U.S. Pat. No. 5,470,813. Polyols made using the catalysts of the invention have exceptionally low unsaturation, typically less than 0.006 meq/g.

The invention also includes methods for making the catalysts. In one method, the catalyst is made by using an excess amount of the metal salt, but the excess is less than a 100% stoichiometric excess relative to the amount of metal cyanide salt. The resulting catalyst contains less than about 0.2 moles of the metal salt per mole of DMC compound in the catalyst. In a second method, a larger excess of the metal salt can be used, but the resulting catalyst is subsequently washed with a mixture of water and an organic complexing agent in a manner effective to produce a DMC catalyst that contains less than about 0.2 moles of the metal salt per mole of DMC compound in the catalyst.

DETAILED DESCRIPTION OF THE INVENTION

Figure 1:
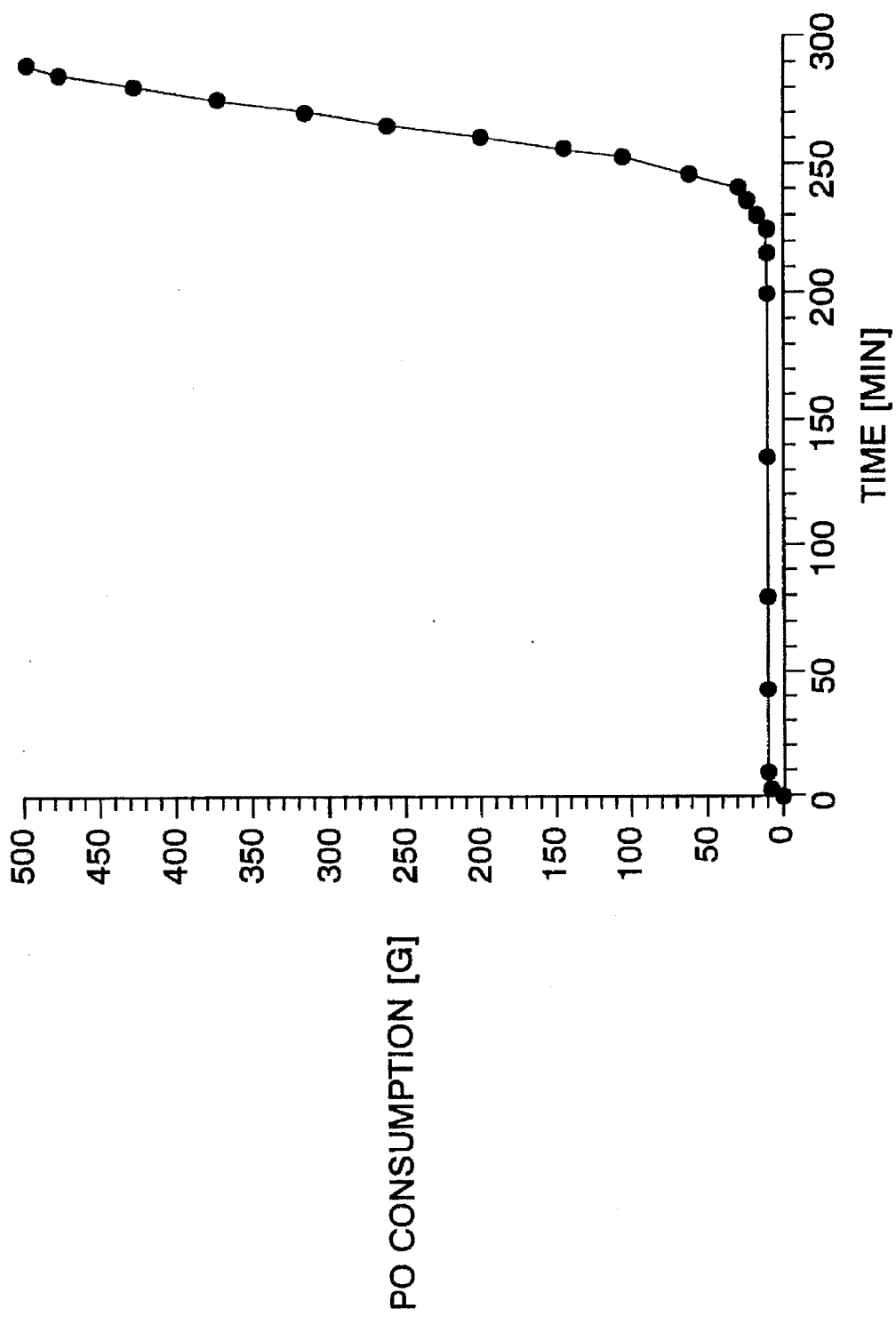
FIG. 1 shows a plot of propylene oxide consumption versus time during a polymerization reaction with one of the catalyst compositions of the invention at 100 ppm catalyst. The rate of reaction is determined from the slope of this plot.

The double metal cyanide (DMC) catalysts of the invention generally resemble the catalysts known in the art, but contain a relatively low level of the metal salt. The catalysts of the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel (II) nitrate, and the like, and mixtures thereof. Zinc halides are preferred.

The water-soluble metal cyanide salts used to make the double metal cyanide compounds useful in the invention preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, the teachings of which are incorporated herein by reference.

The catalysts of the invention are prepared in the presence of a complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. As is explained elsewhere in this application, the manner in which the complexing agent is introduced into the DMC complex can be extremely important. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

The conventional method of preparing DMC compounds useful for epoxide polymerization is fully described in many references, including U.S. Pat. Nos. 5,158,922, 4,843,054, 4,477,589, 3,427,335, 3,427,334, 3,427,256, 3,278,457, and 3,941,849, and Japanese Pat. Appl. Kokai No. 4-145123. The teachings of these references related to conventional catalyst preparation and suitable DMC compounds are incorporated herein by reference in their entirety.

The catalysts of the invention differ from DMC catalysts known in the art in that those of the invention contain a relatively small proportion of the metal salt. Catalysts of the invention contain some metal salt, but in an amount less than about 0.2 moles of metal salt per mole of DMC compound. Preferably, the catalysts contain less than about 0.15 moles of metal salt per mole of DMC compound; most preferred are catalysts contain less than about 0.1 moles of metal salt per mole of DMC compound.

DMC complexes that contain no metal salt are inactive as epoxide polymerization catalysts. Thus, it is necessary to leave some metal salt in the catalyst during preparation. Excessive washing of the catalyst with water can deactivate DMC catalysts by removing all of the metal salt component, even if an excess of the metal salt is used to prepare the catalyst. DMC catalysts made by conventional methods with a large excess of metal salt contain more than 0.2, typically more than 0.5, moles of metal salt per mole of DMC compound.

The catalysts of the invention are substantially crystalline. Powder X-ray diffraction analysis shows that these catalysts have predominantly sharp lines, which indicates a relatively high degree of crystallinity (see FIGS. 2 and 3). Interestingly, zinc hexacyanocobaltate dodecahydrate, which is prepared in the absence of a complexing agent, is also highly crystalline by X-ray analysis (see FIG. 4), but has no activity for polymerizing epoxides.

Figure 5:
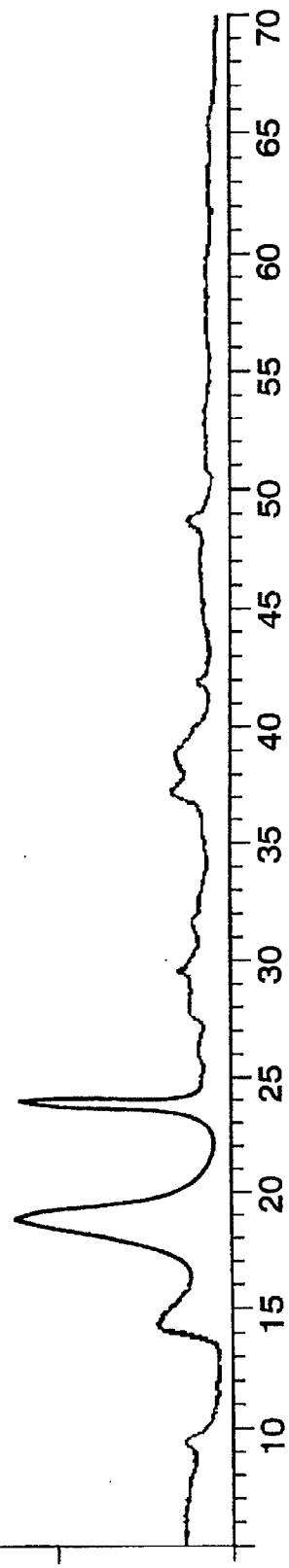

Earlier, we prepared highly active DMC catalysts that were substantially amorphous by X-ray diffraction analysis (see FIG. 5; see also U.S. Pat. No. 5,470,813). These catalysts had much greater activity than DMC catalysts previously known in the art. Catalysts that polymerize propylene oxide at rates greater than about 3 g PO/min. at 100 ppm of catalyst at 105° C. (based on the weight of finished polyether) were obtained. Catalysts having both a high degree of crystallinity and high activity were not known.

Figure 2:
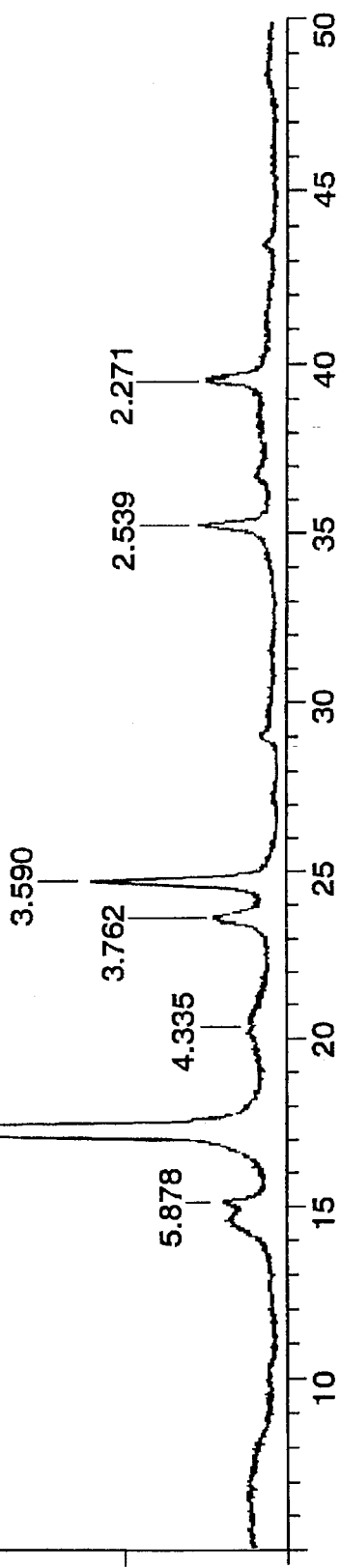
FIGS. 2–5 are powder X-ray diffraction patterns for various zinc hexacyanocobaltate catalysts. The figures are described more fully below.
Figure 3:
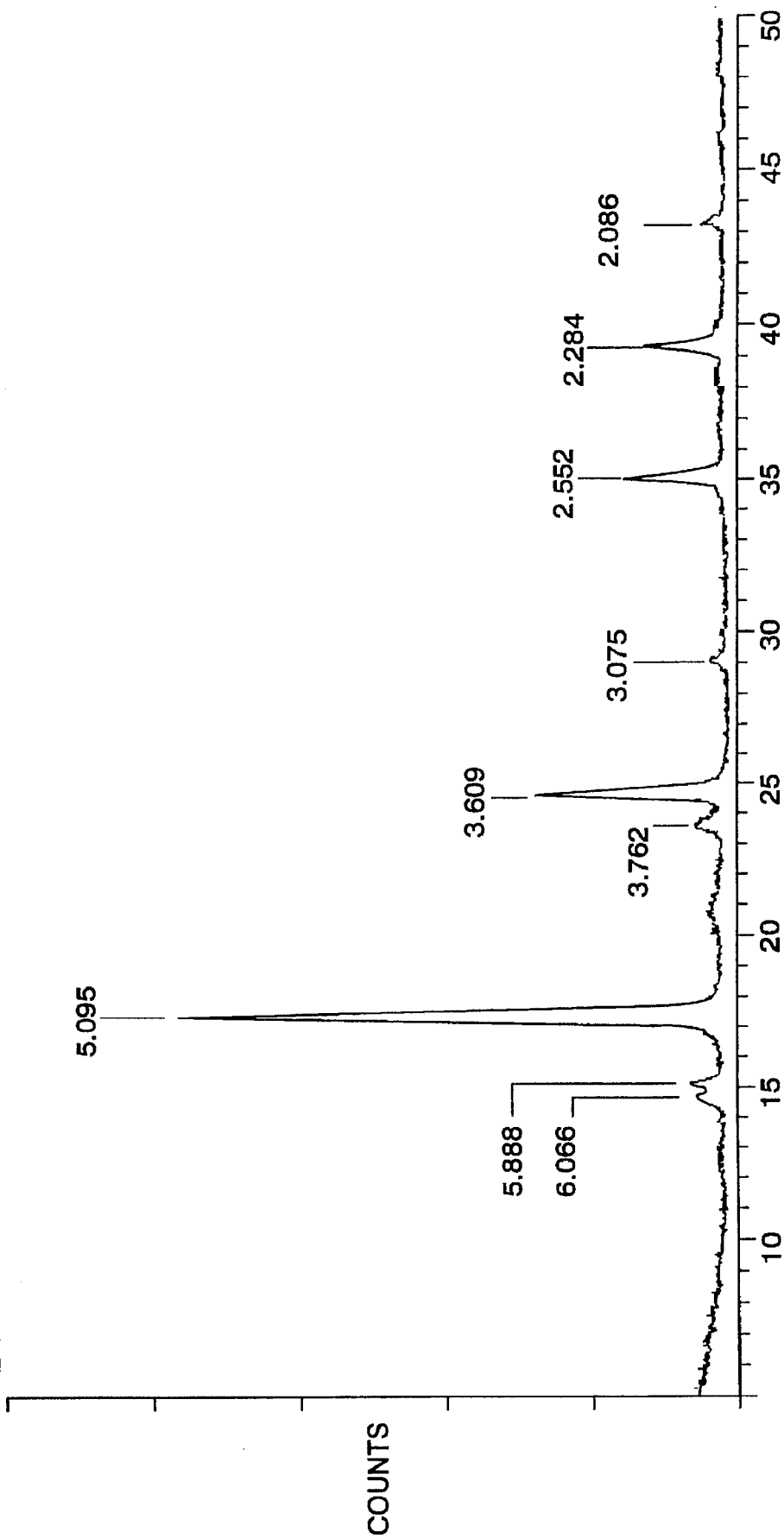
Figure 4:
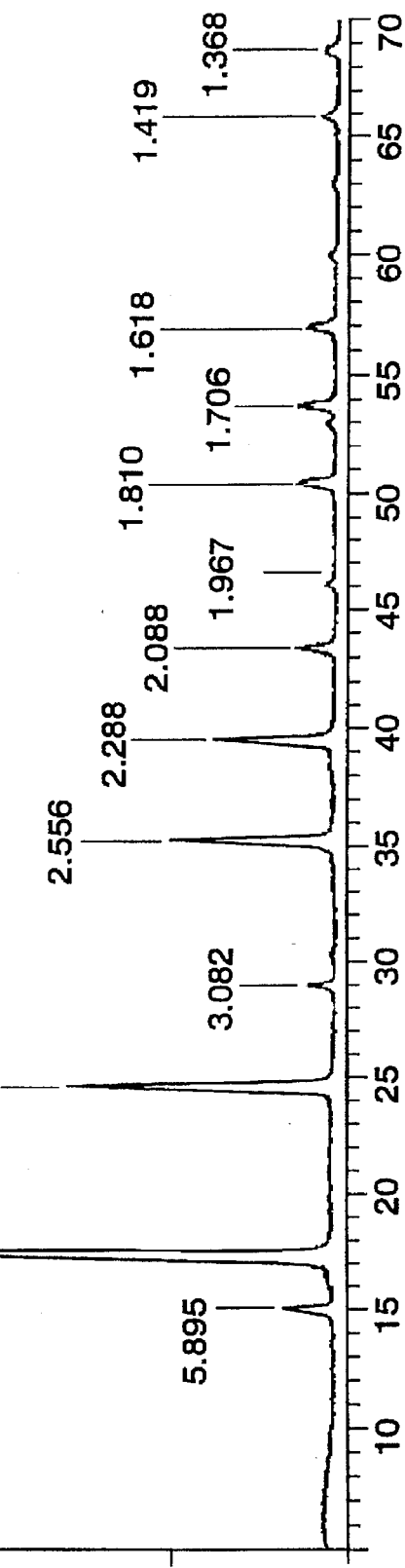

We surprisingly found that catalysts prepared under conditions effective to leave a small proportion of metal halide in the catalysts are highly crystalline and can polymerize propylene oxide at a rate greater than about 3 g PO/min. at 100 ppm of catalyst at 105° C. (based on the weight of finished polyether). For example, zinc hexacyanocobaltate catalysts prepared using the methods of the invention contained, by elemental analysis (chloride content), about 0.07 to 0.18 moles of zinc chloride per mote of zinc hexacyanocobaltate. The catalysts exhibit substantially crystalline powder X-ray diffraction patterns with signals present at about 6.1, 5.9, 5.1, 4.2, 3.8, 3.6, 2.5, and 2.3 (d-spacing, angstroms). FIGS. 2 and 3 show powder X-ray diffraction patterns for catalysts of the invention.

In addition to their high activities, the catalysts of the invention give polyether polyol products having an exceptionally low level of unsaturation. The value of low-unsaturation polyols for making polyurethanes with excellent physical properties is well documented. Polyether polyols having unsaturations less than about 0.004 meq/g can be made using the catalysts of the invention.

The invention includes methods for making the highly active DMC complex catalysts. Generally, the methods used to make the catalysts of the invention resemble the methods known for making the highly active, substantially amorphous catalysts described in U.S. Pat. No. 5,470,813 and in copending application Ser. No. 08/435,116, filed May 15, 1995. In these methods, a substantially amorphous DMC catalyst is prepared either by: (1) intimately combining and reacting aqueous solutions of metal salt and metal cyanide salt in the presence of an organic complexing agent, usually with homogenization, high-shear, or impingement mixing of the reactants; or (2) reacting aqueous solutions of the metal salt and metal cyanide salt in the presence of the organic complexing agent, wherein one or both of the reactant solutions contains the complexing agent. When the second method is used (organic complexing agent present before reaction of metal salt and metal cyanide salt), intimate combination of the reactants is not required to obtain a substantially amorphous catalyst.

The methods of the invention, which vary these approaches somewhat, surprisingly give substantially crystalline DMC catalysts. The methods of the invention give catalysts that contains a relatively small proportion of metal salt compared with the substantially amorphous catalysts described in preceding paragraph.

One way to make a catalyst of the invention is to follow the procedures used to make a substantially amorphous catalyst, but to use less than a large excess of the metal salt in making the catalyst (see Example 3 and FIG. 3). Previous methods used a large excess of the metal salt. In this method of the invention, the metal salt is used in excess, but the excess amount is less than a 100% stoichiometric excess relative to the amount of metal cyanide salt. The resulting catalyst contains less than about 0.2 moles of the metal salt per mole of DMC compound in the catalyst. (Previous catalysts contained at least about 0.5 moles of the metal salt per mole of DMC compound in the catalyst.)

Another way to make a catalyst of the invention is to follow the procedures used to make a substantially amorphous catalyst, but to modify the washing routine (see Examples 1–2 and FIG. 2). In this method, aqueous solutions of the metal salt and metal cyanide salt are first reacted in the presence of an organic complexing agent. As in the case of making substantially amorphous catalysts, the reactants are either intimately combined, or the organic complexing agent is present initially in one or both of the reactant solutions. The metal salt is used in an excess amount compared to the amount of metal cyanide salt, and the excess can be large or small. Unlike prior methods, this method washes the catalyst precipitate with a mixture of water and an organic complexing agent in a manner effective to produce a highly active DMC complex catalyst that contains less than about 0.2 moles of the metal salt per mole of DMC compound in the catalyst.

The amount and kind of washing needed to achieve less than about 0.2 moles of residual metal salt per mole of DMC compound in the catalyst depend on many factors, including which complexing agent is used, the relative amounts of water and organic complexing agent in the wash solutions, the number of washes, the volume of wash solution per gram of catalyst, the separation method used (i.e., filtration or centrifugation), and other factors. With routine experimentation, a skilled person can select conditions to make a catalyst of the invention that best suits her needs. The effectiveness of the washing routine can be gauged by measuring the chlorine and metals contents of the catalyst, and by inspecting the powder X-ray diffraction pattern exhibited by the catalyst.

The invention includes a process for making an epoxide polymer. This process comprises polymerizing an epoxide in the presence of a double metal cyanide catalyst composition of the invention. Preferred epoxides are ethylene oxide, propylene oxide, butene oxides, styrene oxide, and the like, and mixtures thereof. The process can be used to make random or block copolymers. The epoxide polymer is preferably a polyether polyol made by polymerizing an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes (as taught in U.S. Pat. Nos. 3,278,457 and 3,404,109) to give polyethers, or with anhydrides (as taught in U.S. Pat. Nos. 5,145,883 and 3,538,043) to give polyester or polyetherester polyols. The preparation of polyether, polyester, and polyetherester polyols using double metal cyanide catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, *SPI Proceedings, 32nd Annual Polyurethane Tech./Market. Conf.* (1989) 360. The teachings of these U.S. patents related to polyol synthesis using DMC catalysts are incorporated herein by reference in their entirety.

The DMC catalysts of the invention are highly active compared to conventional DMC catalysts. A consequence of higher polymerization rates is that polyol producers can use less of the relatively expensive DMC catalyst and save money. More active catalysts also permit the producer to reduce batch times and increase productivity. In addition, the catalysts of the invention are often active enough to allow their use at very low concentrations, such as 25 ppm or less. At such low concentrations, the catalyst can often be left in the polyether polyol without an adverse effect on product quality. The ability to leave catalysts in the polyol is an important advantage because commercial polyols currently require a catalyst removal step.

Polyether polyols prepared using the catalysts of the invention have exceptionally low unsaturations, consistently less than about 0.007 meq/g. Preferred polyols of the invention have unsaturations less than about 0.006 meq/g, and more preferably less than about 0.005 meq/g. The reduced unsaturation compared with polyols made with conventional DMC catalysts offers advantages for polyurethanes made with the polyols of the invention.

Polyether polyols made with the catalysts of the invention preferably have average hydroxyl functionalities from about 2 to 8, more preferably from about 2 to 6, and most preferably from about 2 to 3. The polyols preferably have number average molecular weights within the range of about 500 to about 50,000. A more preferred range is from about 1,000 to about 12,000; most preferred is the range from about 2,000 to about 8,000.

The following examples merely illustrate the invention. Those skilled in the art will recognize many variations that are within the spirit of the invention and scope of the claims.

EXAMPLE 1

Preparation of a Zinc Hexacyanocobaltate/tert-Butyl Alcohol Complex Containing Less Than 0.2 moles of $ZnCl_2$ per mole of $Zn_3[Co(CN)_6]_2$ In this example, a 306% stoichiometric excess of zinc chloride is used to make the catalyst, but the washing routine reduces the amount of zinc chloride remaining to less than 0.2 moles per mole of zinc hexacyanocobaltate present in the catalyst.

Potassium hexacyanocobaltate (4 g) is dissolved in water (75 mL) to make Solution 1. Zinc chloride (10 g) is dissolved in distilled water (15 mL) to make Solution 2. Solution 3 contains tert-butyl alcohol (50 mL) and distilled water (150 mL).

Solution 1 is combined with Solution 3. The aqueous zinc chloride solution (Solution 2) is then added slowly while homogenizing the reactant mixture. After zinc chloride addition is complete, the mixture is homogenized for another 20 min.

The resulting solid catalyst is isolated by filtration (5 micron filter) at 40 psi. The wet solids are combined with tert-butyl alcohol (50 mL) and distilled water (50 mL), and the mixture is homogenized for 20 min. The catalyst is filtered as previously described. The wet solids are combined with tert-butyl alcohol (70 mL) and distilled water (30 mL), the mixture is homogenized for 20 min., and the solids are isolated. Finally, the solids are combined with neat tert-butyl alcohol (100 mL), homogenized, and isolated. The solids are then dried in a vacuum oven at 50°–60° C., 30 in. (Hg) for 4–5 h.

The catalyst polymerizes propylene oxide at a rate of 11.1 g/min (100 ppm catalyst, 105° C., as described in Example 4). Elemental analysis of the catalyst indicates 1.4 wt. % chloride content (0.14 moles of $ZnCl_2$ per mole of $Zn_3[Co(CN)_6]_2$). Powder X-ray diffraction analysis of the catalyst shows a substantially crystalline material that exhibits signals at about: 6.1, 5.9, 5.1, 4.2, 3.8, 3.6, 2.5, and 2.3 (d-spacing, angstroms) (see FIG. 2). A polyether triol made using the catalyst (see Example 5 for procedure) has an unsaturation of 0.0043 meq/g and a hydroxyl number of 30 mg KOH/g.

EXAMPLE 2

Preparation of a Zinc Hexacyanocobaltate/tert-Butyl Alcohol Complex Containing Less Than 0.2 moles of $ZnCl_2$ per mole of $ZN_3[Co(CN)_6]_2$ In this example, a 306% stoichiometric excess of zinc chloride is used to make the catalyst, but the washing routine reduces the amount of zinc chloride remaining to less than 0.2 moles per mole of zinc hexacyanocobaltate present in the catalyst.

The procedure of Example 1 is generally followed, except that the homogenized reaction mixture is heated to 30° C. during the addition of aqueous zinc chloride.

The resulting solid catalyst is isolated by filtration as in Example 1 except that a 1.2 micron nylon filter is used. The washing sequence uses a 50/50 (volume) mixture of tert-butyl alcohol/water for the first two washes, and neat tert-butyl alcohol for the final wash. The catalyst is isolated and dried as described in Example 1.

The catalyst polymerizes propylene oxide at a rate of 10 g/min (100 ppm catalyst, 105° C., as described in Example 4). Elemental analysis of the catalyst indicates 1.8 wt. % chloride content (0.18 moles of $ZnCl_2$ per mole of $Zn_3[Co(CN)_6]_2$). Powder X-ray diffraction analysis of the catalyst shows a substantially crystalline material that exhibits signals at about: 6.1, 5.9, 5.1, 4.2, 3.8, 3.6, 2.5, and 2.3 (d-spacing, angstroms). A polyether triol made using the catalyst (see Example 5 for procedure) has an unsaturation of 0.0039 meq/g and a hydroxyl number of 31.1 mg KOH/g.

EXAMPLE 3

Preparation of a Zinc Hexacyanocobaltate/tert-Butyl Alcohol Complex Containing Less Than 0.2 moles of $ZnCl_2$ per mole of $Zn_3[Co(CN)_6]_2$ This example illustrates the preparation of a DMC catalyst by using only a 63% stoichiometric excess of the metal salt to prepare the catalyst.

A one-liter round-bottom flask equipped with mechanical stirrer, pressure-equalizing addition funnel, and thermometer is charged with potassium hexacyanocobaltate (5.0 g), tert-butyl alcohol (95 g), and distilled water (445 g). The mixture is stirred until all of the metal cyanide salt dissolves. The solution is warmed to 25° C. A solution of zinc chloride (5 g) in water (5 g) is added over 1 min. to the stirred reaction mixture. Stirring continues for another 30 min. at 25° C.

The resulting white suspension is filtered through a pressure filter at 30 psig. The solids are resuspended with vigorous stirring in a solution of tert-butyl alcohol (68 g) and water (38 g), which is a 70:30 (by volume) solution. After all of the solids are completely suspended in the wash mixture, stirring continues for an additional 30 min. The solids are again isolated by pressure filtration, and are resuspended in tert-butyl alcohol (99.5%) (98 g, 125 mL). After all of the solids are completely suspended in the wash mixture, stirring continues for an additional 30 min. The solids are isolated and dried in a vacuum oven at 45° C., 30 in. (Hg) for 18 h.

The catalyst polymerizes propylene oxide at a rate of 10.9 g/min (100 ppm catalyst, 105° C., as described in Example 4). Elemental analysis of the catalyst indicates 0.7 wt. % chloride content (0.07 moles of $ZnCl_2$ per mole of $Zn_3[Co(CN)_6]_2$). Powder X-ray diffraction analysis of the catalyst (see FIG. 3) shows a substantially crystalline material that exhibits signals at about: 6.1, 5.9, 5.1, 4.2, 3.8, 3.6, 3.1, 2.5, 2.3, and 2.1 (d-spacing, angstroms). A polyether triol made using the catalyst (see Example 5 for procedure) has an unsaturation of 0.0026 meq/g and a hydroxyl number of 29.8 mg KOH/g.

EXAMPLE 4

Epoxide Polymerizations: Rate Experiments— General Procedure

A one-liter stirred reactor is charged with polyoxypropylene triol (700 mol. wt.) starter (70 g) and zinc hexacyanocobaltate catalyst (0.057 g, 100 ppm level in finished polyol). The mixture is stirred and heated to 105° C., and is stripped under vacuum to remove traces of water from the triol starter. The reactor pressure is adjusted to a vacuum of about 30 in. (Hg), and propylene oxide (10–11 g) is added in one portion. The reactor pressure is then monitored carefully. Additional propylene oxide is not added until an accelerated pressure drop occurs in the reactor; the pressure drop is evidence that the catalyst has become activated. When catalyst activation is verified, the remaining propylene oxide (490 g) is added gradually to keep the reactor pressure at about 10 psig. After propylene oxide addition is complete, the mixture is held at 105° C. until a constant pressure is observed. Residual unreacted monomer is then stripped under vacuum from the polyol product, and the polyol is cooled and recovered.

To determine reaction rate, a plot of PO consumption (g) vs. reaction time (min) is prepared (see FIG. 1). The slope of the curve at its steepest point is measured to find the reaction rate in grams of PO converted per minute. The intersection of this line and a horizontal line extended from the baseline of the curve is taken as the induction time (in minutes) required for the catalyst to become active.

When this procedure is used to measure propylene oxide polymerization rates, the catalysts of the invention typically polymerize PO at rates in excess of about 10 g/min at 100 ppm catalyst at 105° C. (see FIG. 1). In contrast, a catalyst made by the procedure of U.S. Pat. No. 5,158,922 polymerizes PO at a rate of about 2 g/min. at 100 ppm catalyst at 105° C.

EXAMPLE 5

Polyether Polyol Synthesis

A two-gallon stirred reactor is charged with polyoxypropylene triol (700 mol. wt.) starter (685 g) and zinc hexacyanocobaltate catalyst (1.63 g). The mixture is stirred and heated to 105° C., and is stripped under vacuum to remove traces of water from the triol starter. Propylene oxide (102 g) is fed to the reactor, initially under a vacuum of about 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (5713 g) is added gradually over about 2 h while maintaining a reactor pressure less than 40 psi. After propylene oxide addition is complete, the mixture is held at 105° C. until a constant pressure is observed. Residual unreacted monomer is then stripped under vacuum from the polyol product. The hot polyol product is filtered at 100° C. through a filter cartridge (0.45 to 1.2 microns) attached to the bottom of the reactor to remove the catalyst.

The preceding examples are meant only as illustrations; the following claims define the scope of the invention.

We claim:

1. A double metal cyanide (DMC) complex catalyst which comprises a DMC compound, an organic complexing agent, and a metal salt, wherein the catalyst contains less than about 0.2 moles of the metal salt per mole of DMC compound.

2. The catalyst of claim 1 wherein the DMC compound is a zinc hexacyanocobaltate and the metal salt is a zinc halide.

3. The catalyst of claim 1 containing less than about 0.15 moles of the metal salt per mole of DMC compound.

4. The catalyst of claim 1 containing less than about 0.1 moles of the metal salt per mole of DMC compound.

5. The catalyst of claim 1 wherein the catalyst is substantially crystalline and has powder X-ray diffraction signals at about 6.1, 5.9, 5.1, 4.2, 3.8, 3.6, 2.5, and 2.3 (d-spacing, angstroms).

6. The catalyst of claim 1 having a powder X-ray diffraction pattern substantially as shown in FIG. 2.

7. The catalyst of claim 1 wherein the organic complexing agent is selected from the group consisting of alcohols, aldehydes, ketones, ethers, esters, amides, ureas, nitriles, sulfides, and mixtures thereof.

8. The catalyst of claim 1 wherein the organic complexing agent is tert-butyl alcohol.

9. The catalyst of claim 1 effective to polymerize propylene oxide at a rate in excess of 3 g PO/min at 100 ppm of catalyst, based on the weight of finished polyether, at 105° C.

10. The catalyst of claim 1 capable of producing a polyether polyol having an unsaturation less than about 0.005 meq/g.

11. A zinc hexacyanocobaltate complex catalyst which comprises zinc hexacyanocobaltate, tert-butyl alcohol, and zinc chloride, wherein the catalyst contains less than about 0.2 moles of zinc chloride per mole of zinc hexacyanocobaltate.

12. The catalyst of claim 11 containing less than about 0.15 moles of zinc chloride per mole of zinc hexacyanocobaltate.

13. The catalyst of claim 11 containing less than about 0.1 moles of zinc chloride per mole of zinc hexacyanocobaltate.

14. The catalyst of claim 11 wherein the catalyst is substantially crystalline and has powder X-ray diffraction signals at about 6.1, 5.9, 5.1, 4.2, 3.8, 3.6, 2.5, and 2.3 (d-spacing, angstroms).

15. The catalyst of claim 11 having a powder X-ray diffraction pattern substantially as shown in FIG. 2.

16. A method of making a highly active DMC complex catalyst, said method comprising reacting aqueous solutions of a metal salt and a metal cyanide salt in the presence of an organic complexing agent, wherein the metal salt is used in an excess amount less than a 100% stoichiometric excess relative to the amount of metal cyanide salt, and the resulting catalyst contains less than about 0.2 moles of the metal salt per mole of DMC compound in the catalyst.

17. The method of claim 16 wherein the DMC catalyst is a zinc hexacyanocobaltate.

18. The method of claim 16 wherein the organic complexing agent is tert-butyl alcohol.

19. The method of claim 16 wherein the DMC catalyst is substantially crystalline and has powder X-ray diffraction signals at about 6.1, 5.9, 5.1, 4.2, 3.8, 3.6, 2.5, and 2.3 (d-spacing, angstroms).

20. The method of claim 16 wherein the DMC catalyst contains less than about 0.1 moles of the metal salt per mole of DMC compound in the catalyst.

21. A method of making a highly active DMC complex catalyst, said method comprising:

(a) reacting aqueous solutions of a metal salt and a metal cyanide salt in the presence of an organic complexing agent to produce a catalyst precipitate, said metal salt being used in excess compared with the amount of metal cyanide salt used; and (b) washing the catalyst precipitate with a mixture of water and organic complexing agent in a manner effective to produce a highly active DMC complex catalyst that contains less than about 0.2 moles of the metal salt per mole of DMC compound in the catalyst.

22. The method of claim 21 wherein the DMC complex catalyst is a zinc hexacyanocobaltate.

23. The method of claim 21 wherein the organic complexing agent is tert-butyl alcohol.

24. The method of claim 21 wherein the DMC catalyst is substantially crystalline and has powder X-ray diffraction signals at about 6.1, 5.9, 5.1, 4.2, 3.8, 3.6, 2.5, and 2.3 (d-spacing, angstroms).

25. The method of claim 21 wherein the DMC catalyst contains less than about 0.1 moles of the metal salt per mole of DMC compound in the catalyst.

* * * * *